United States Patent
Mecozzi

(10) Patent No.: US 7,963,749 B1
(45) Date of Patent: Jun. 21, 2011

(54) FAN WITH VARIABLE MOTOR SPEED AND DISK TYPE UNLOADING DEVICE

(75) Inventor: Walter P. Mecozzi, Edmond, OK (US)

(73) Assignee: ClimateCraft Technologies, Inc., Oklahoma City, OK (US)

( * ) Notice: Subject to any disclaimer, the term of this patent is extended or adjusted under 35 U.S.C. 154(b) by 545 days.

(21) Appl. No.: 11/943,392

(22) Filed: Nov. 20, 2007

Related U.S. Application Data

(60) Provisional application No. 60/867,176, filed on Nov. 25, 2006.

(51) Int. Cl.
*F04B 49/02* (2006.01)

(52) U.S. Cl. .......................................... 417/309

(58) Field of Classification Search .................. 415/157, 415/167; 416/161; 417/309
See application file for complete search history.

(56) References Cited

U.S. PATENT DOCUMENTS

| | | | |
|---|---|---|---|
| 675,301 A * | 5/1901 | Scheubeck | 416/133 |
| 1,843,959 A * | 2/1932 | May | 33/328 |
| 2,235,706 A * | 3/1941 | Hanus | 55/418 |
| 2,430,225 A * | 11/1947 | Hagler | 417/423.15 |
| 2,459,815 A * | 1/1949 | Hammell | 415/32 |
| 3,594,106 A | 7/1971 | Garrison | |
| 3,625,629 A * | 12/1971 | Morrison et al. | 415/157 |
| 3,698,839 A | 10/1972 | Distefano | |
| 3,757,809 A | 9/1973 | Le Bar, Jr. | |
| 3,794,447 A | 2/1974 | Bullough | |
| 4,195,664 A | 4/1980 | Bullock et al. | |
| 4,252,751 A | 2/1981 | Shito | |
| 4,411,590 A | 10/1983 | Meredith | |
| 4,553,404 A * | 11/1985 | Malchow et al. | 62/262 |
| 4,929,150 A * | 5/1990 | Daw | 415/157 |
| 5,161,941 A * | 11/1992 | Ratner | 415/150 |
| 5,306,116 A | 4/1994 | Gunn et al. | |

(Continued)

FOREIGN PATENT DOCUMENTS

WO 2004085928 A2 10/2004

(Continued)

OTHER PUBLICATIONS

Governair Corp., "Vari-Cone Unloading Systems," Bulletin COMP-VC-0494, undated (published prior to the filing date of the instant application) Oklahoma City, Oklahoma USA.

*Primary Examiner* — Devon C Kramer
*Assistant Examiner* — Bryan Lettman
(74) *Attorney, Agent, or Firm* — Mary M. Lee

(57) ABSTRACT

A fan unit for use in an air delivery system. The fan unit comprises a variable speed control for controlling the speed of the fan wheel in combination with a disk-type unloader assembly for controlling the air flow in response to fan speed changes. The unloader disk assembly includes an actuator that is responsive to changes in the air pressure on the disk and is biased in the closed position. At full speed, air flow through the housing presses the disk to the fully open position. As the fan speed slows and air flow declines, the actuator pulls the disk to an intermediate position, reducing the air flow through the fan. The disk unloader with its air pressure responsive actuator is also useful in fan units without a variable speed control. The fan unit may be used individually or as part of a fan array of like units.

14 Claims, 8 Drawing Sheets

U.S. PATENT DOCUMENTS

| | | |
|---|---|---|
| 5,355,691 A | 10/1994 | Sullivan et al. |
| 5,456,115 A | 10/1995 | Kuwabara et al. |
| 5,947,680 A | 9/1999 | Harada et al. |
| 6,270,309 B1 | 8/2001 | Ghetzler et al. |
| 6,454,556 B1 * | 9/2002 | De Nichilo .................. 425/384 |
| 7,137,775 B2 | 11/2006 | Hopkins |
| 7,179,046 B2 | 2/2007 | Hopkins |
| 2005/0019149 A1 | 1/2005 | Pickelman et al. |
| 2005/0180846 A1 | 8/2005 | Hopkins |
| 2007/0104568 A1 | 5/2007 | Hopkins |

FOREIGN PATENT DOCUMENTS

| | | |
|---|---|---|
| WO | 2004085928 A3 | 10/2004 |
| WO | 2006104735 A1 | 10/2006 |

* cited by examiner

FAN WITH VARIABLE MOTOR SPEED AND DISK TYPE UNLOADING DEVICE

This application claims the benefit of U.S. Provisional Application No. 60/867,176 filed Nov. 25, 2006, and the contents thereof are incorporated herein by reference.

FIELD OF THE INVENTION

The present invention relates generally to air handling or air delivery systems for heating, ventilation and air conditioning ("HVAC") systems and, more particularly but without limitation, to devices for managing reduced air flow through fan units in air delivery systems.

BACKGROUND OF INVENTION

Typical HVAC systems include an air delivery system for delivering the conditioned (cooled, dehumidified, or heated) air to the room or other space in the structure. Many air delivery systems include at least one centrifugal fan unit, and may include a plurality or "array" of such fan units. Most systems are designed to reduce air flow to the space being air conditioned when the space reaches the target temperature, that is, when the load requirements of the space are reduced. Conventionally, there are two main types of systems for reducing air flow through a centrifugal fan.

Some years ago, disk unloaders were commonly used to control the amount of air passing through the centrifugal fan unit. In this type system, a disk inside the inlet funnel of the fan housing is moved by a mechanical actuator that is controlled by a system pressure sensing device. In most systems of this type, the disk unloader completely controlled the system airflow because it was movable between a completely open position, in which air flow through the fan was unobstructed, and a closed position, in which the disk was seated in the inlet funnel completely sealing off air flow. The disk unloader offered good efficiency and sound characteristics.

In most current systems, a variable speed control or drive ("VSD") is used to control air flow through the fan unit by controlling the fan motor speed. VSD's are intrinsically more efficient than the disk type unloading devices and have essentially eliminated the disk unloading device as a device for controlling air volume.

Currently, disk unloader devices are used mainly as shut-off devices for fan systems. For example, in systems comprising a fan array, it is often necessary to turn off one or more of the fans for air flow control as well as for maintenance or repair of the fans. When a fan in a multiple fan system is powered off, air flows backward through that fan, reducing the effectiveness of the remaining operating fans. To improve the system efficiency, backflow must be prevented in the powered-off fan(s), and the disk unloader serves this function well. Backflow is eliminated by driving the disk to the closed or sealed position.

Although VSD's are the most efficient way to control airflow in response to changes in system load requirements, they have one significant disadvantage. Reduction in air flow volume is directly proportional to the fan speed reduction. However, reduction in air flow pressure is proportional to the fan speed reduction squared. This would work well if the system pressure requirements varied with flow in the same way. Most variable airflow systems have terminal devices that increase their flow resistance as the airflow requirements go down. The pressure at lower flows is always higher than it would be than it would if it varied only with the square of the flow reduction.

Additionally, there exists a large area of the potential fan operating range in which the fan exhibits unstable operating characteristics. This area is called the surge region; if the fan is caused to operate in this region, it will operate roughly with increased noise levels and may experience premature bearing failure. The fan can not be allowed to operate in the surge region.

FIG. 1 is a graph illustrating the operational parameters of a typical fan operating curve. As the flow is reduced, the system pressure follows the "System" curve. As seen in FIG. 1, the system curve crosses the minimum flow curve. This is the point where the fan starts to operate in the surge region. At lower speeds the fan will be in surge. This point, therefore, represents the minimum operating flow of the fan. In the system depicted in FIG. 1, the full flow of the fan is 8,500 cfm. The minimum speed is 5,200 cfm or sixty-one percent (61%) of full flow or thirty-nine percent (39%) turndown. If the system needs to operate at lower flows, this fan selection is unacceptable. As is also shown in FIG. 1, the fan pressure at forty percent (40%) speed and lower is lower than the system pressure requirements.

To achieve higher fan turn down a smaller fan would be selected. This would lower the system curve which would increase the fan turn-down. Unfortunately, selecting a smaller fan would result in a reduction in fan efficiency, but this is a trade-off commonly made to increase the operating range of a fan system. In order to increase the fan turndown to sixty percent (60%), the fan selected would often be two fan selections lower than the optimum. This often resulted in a loss of fan efficiency, which required the use of larger motors, which in turn increased the electrical demands of the system on the building.

In summary, though fan unloading with VSD's is more efficient, it has a limited unloading range and requires less than optimum fan selections. The disk unloading system, on the other hand, does not have a limited unloading range. Because the pressure is created by the fan speed, which does not vary in a disk unloading system, the air pressure is unaffected by the reduced air flow. This relationship is illustrated in FIG. 2, which shows the performance of system using a disk unloading device.

As seen in FIG. 2, when using a disk unloading system, the fan can be selected closer to the surge line, which allows fan selection to be optimized. As the air flow through the fan is reduced (due to reduction in available wheel width), the surge region is reduced as well. For this reason, the fan can not go into surge as the disk unloads the fan wheel.

This system has the advantage, as compared to the VSD system, that it can unload over a very wide range with much higher pressures at low flow. On the other hand, it has the disadvantage that it requires much higher fan power as it unloads, as compared to the VSD system. Moreover, conventional disk unloader devices include expensive linear actuators that are difficult to interface with many building control systems.

There is a need for a fan unit with improved efficiency and a wide unloading range. There is a need for a disk unloader with a simple and unobtrusive actuator mechanism. There is a need for a disk unloader with an actuator that requires no additional power. These and other needs are met by the present invention as will be apparent from the following description of a preferred embodiment.

DESCRIPTION OF THE PREFERRED EMBODIMENT(S)

Figure 1:
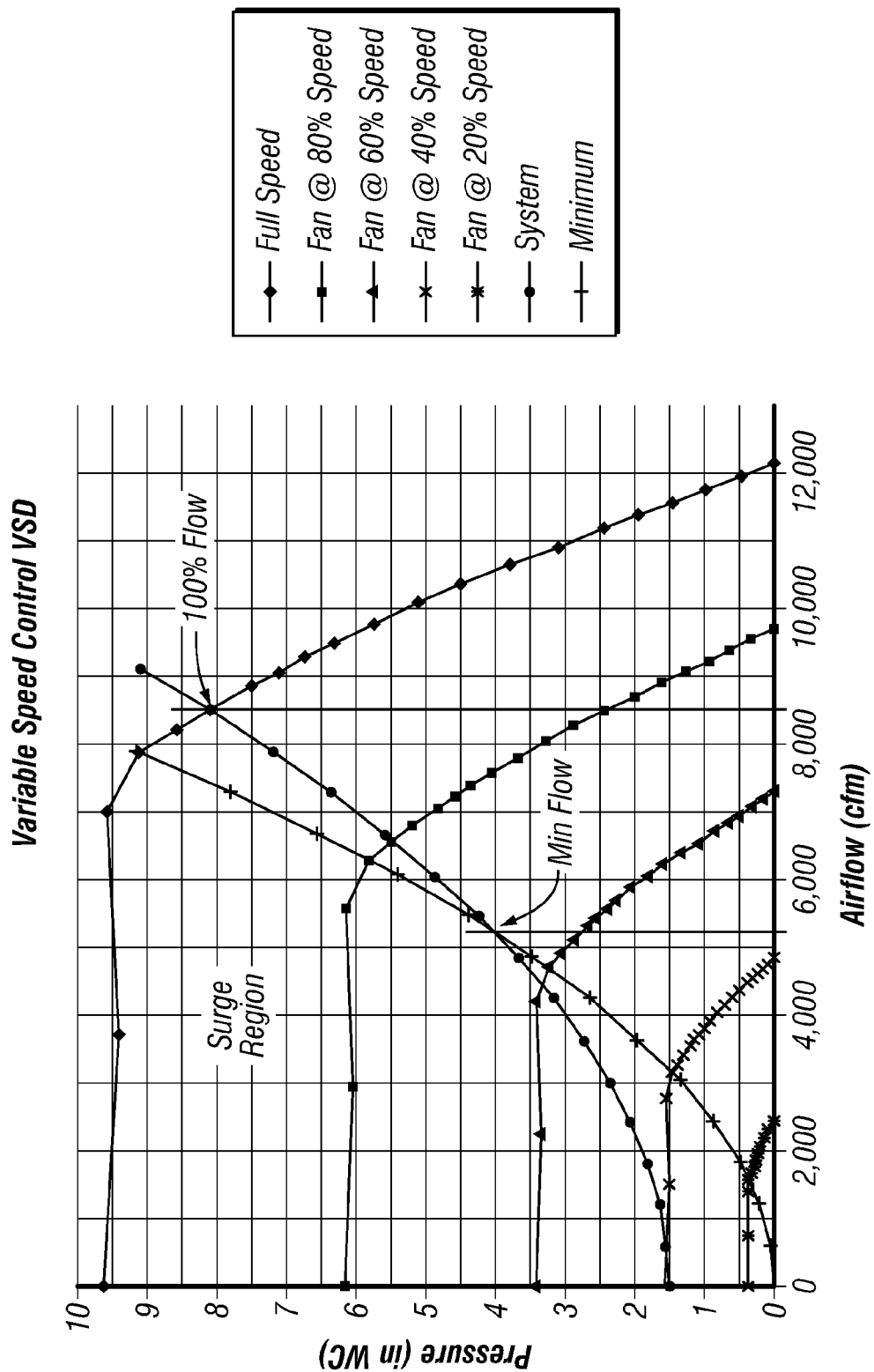
FIG. 1 is a graph of the operating conditions of a typical centrifugal fan with a variable speed drive and illustrates the surge region during which the fan becomes unstable due to lower air pressure.
Figure 2:
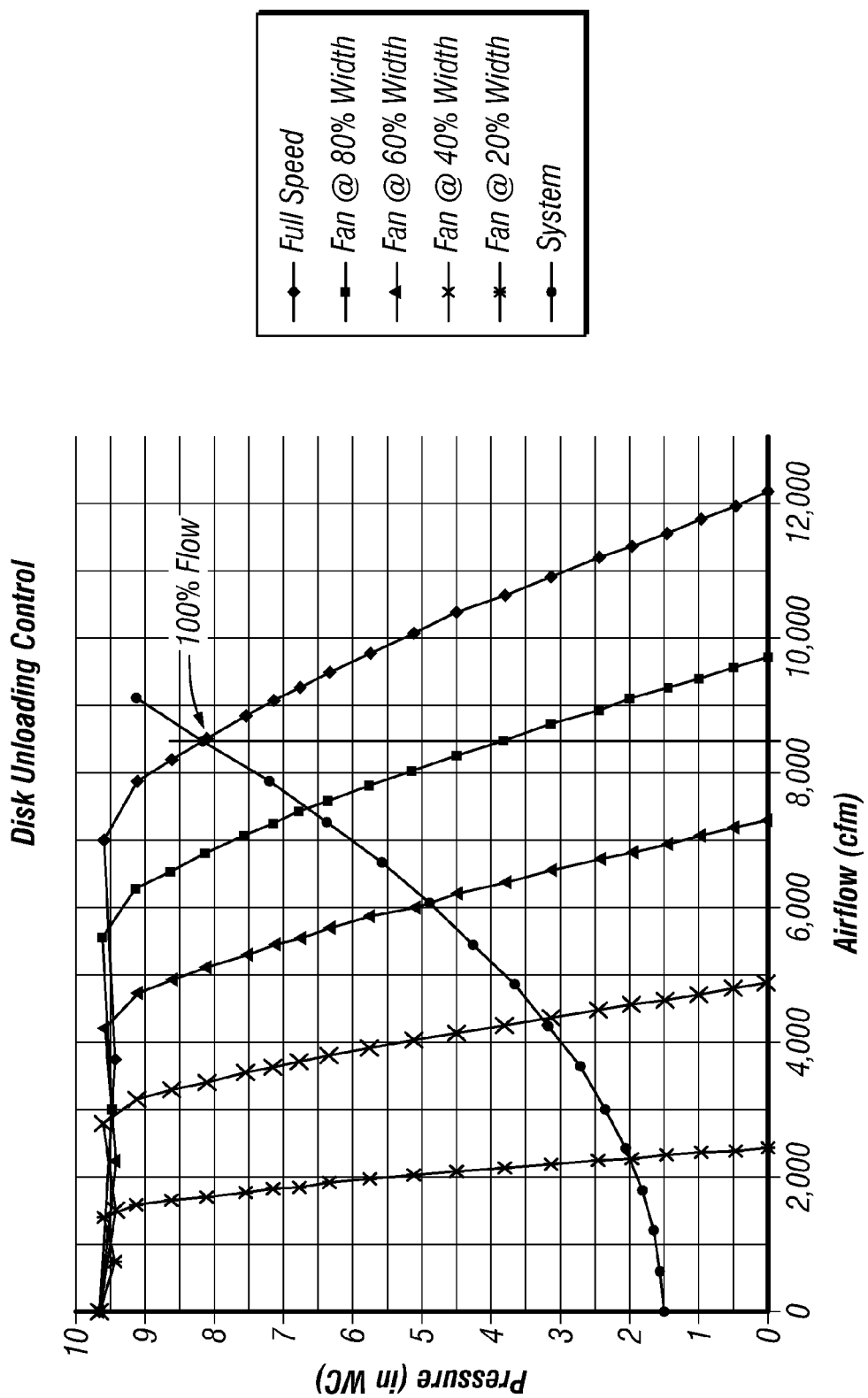
FIG. 2 is a graph of the operating conditions of a typical centrifugal fan with a disk-type unloading device, which eliminates the surge region but at the cost of reduced efficiency.
Figure 3:
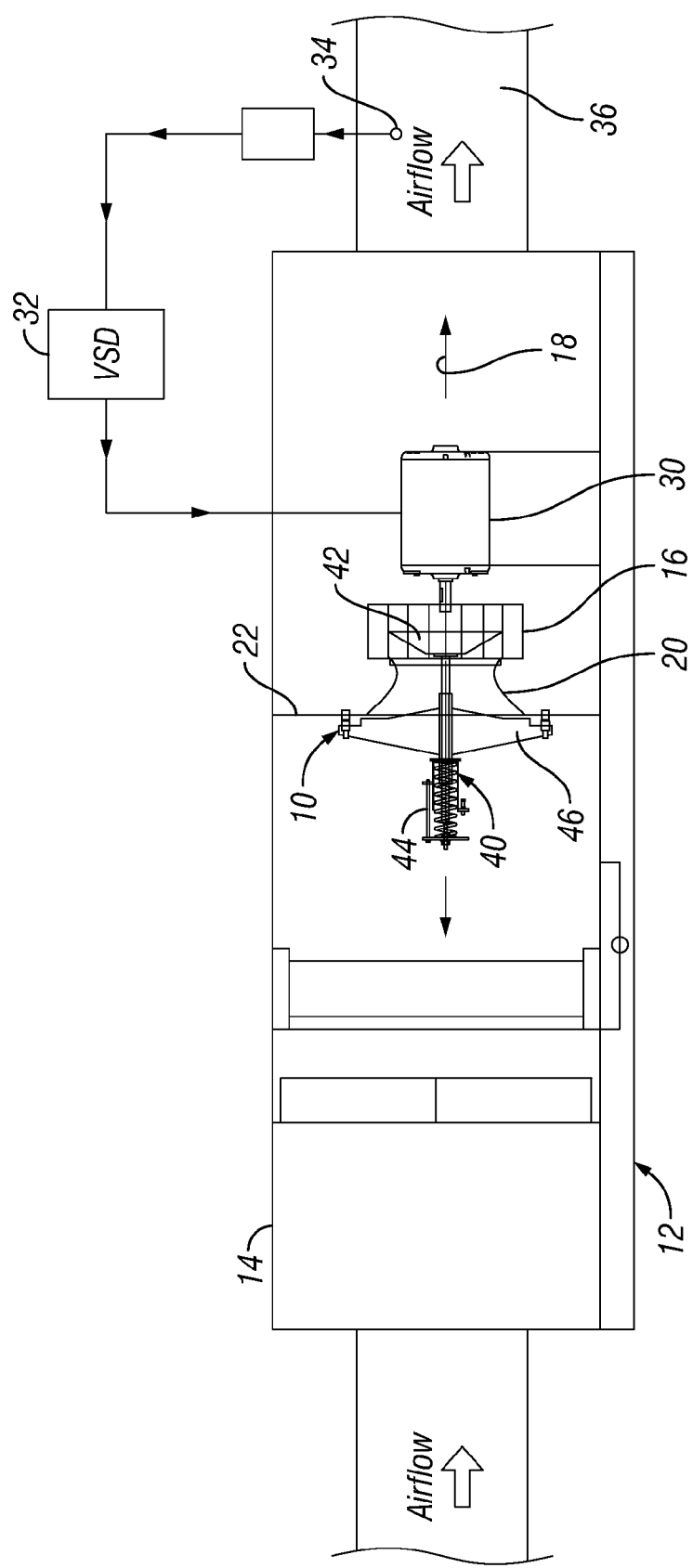
FIG. 3 is a schematic illustration of an air delivery system in accordance with the present invention.

Turning now to FIG. 3, there is shown therein a fan unit designated generally by the reference numeral 10. The fan unit 10 is designed for use in an air delivery system 12 for delivering conditioned air to a space (not shown). The conditioned air may be heated, or cooled, or dehumidified, or a combination of these. The fan unit 10 is mounted in an air tunnel or other enclosure 14 of the air delivery system 12.

The fan unit 10 shown is an unhoused, plenum fan. However, a housed fan may be used instead. The fan unit 10 is supported in the enclosure 14 of the air delivery system 12. The fan unit 10 includes a centrifugal fan wheel 16 supported for rotation about an axis of rotation designated by the line at 18. An inlet, such as the inlet funnel 20, is provided for directing air from the air delivery system 12 upstream of the fan wheel 16 into the fan wheel. Thus, the fan wheel 16 draws air in through the inlet funnel 20 and blows air through the enclosure 14 downstream of the fan unit 10. A partition 22 separates the enclosure 14 at the inlet funnel 20.

The fan unit 10 includes a motor 30 for driving the rotation of the fan wheel 16. The motor 30 shown in FIG. 3 is a direct drive motor. However, the motor may drive the fan wheel 16 indirectly, such as by a belt or chain drive. The motor 30 is controlled by a variable speed control or drive ("VSD") 32 operatively associated with the motor. The VSD 32 controls the speed of the motor 30 in response to a sensor 34 monitoring the condition of the outgoing air stream 36 entering the space. As the load requirements in the room (not shown) change, the VSD 32 increases or decreases the speed of the motor 30 and the fan wheel 16 accordingly, thereby controlling the volume of air entering the space.

Referring still to FIG. 3, the fan unit 10 further preferably comprises an unloading disk assembly 40. The unloading disk assembly 40 generally comprises an unloading disk 42 and an actuator 44. As will be described in more detail hereafter, the unloading disk 42 is axially movable relative to the axis of rotation 18 of the fan wheel 16. The actuator 44 is operatively engaged with the disk 42 and is mounted to the enclosure 14 in a suitable manner, such as with braces 46.

Figure 4:
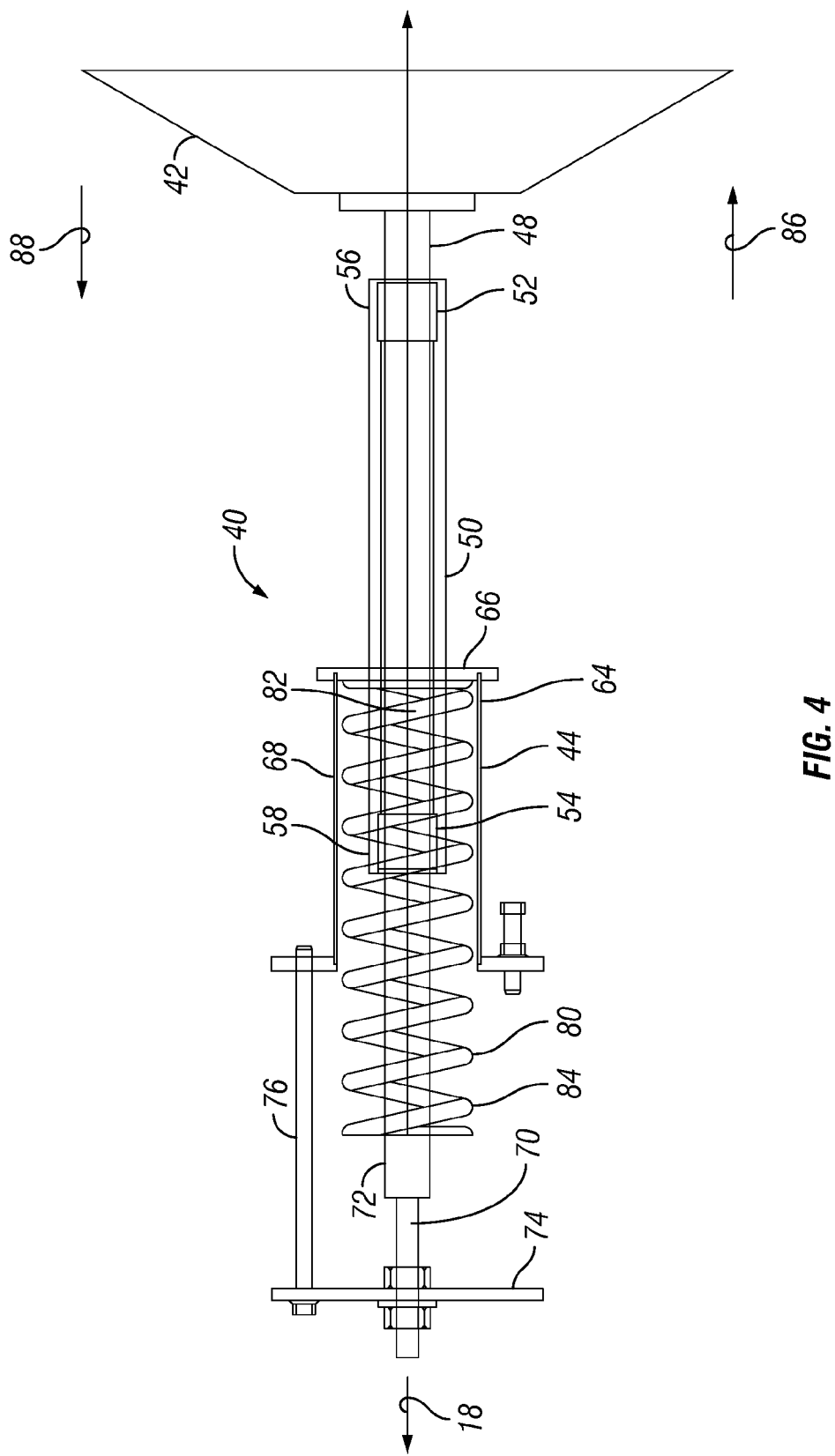
FIG. 4 is a side elevational, partly sectional view of disk unloader assembly employed in the air delivery system of FIG. 3.

Turning now to FIG. 4, the structure of the preferred unloading disk assembly 40 will be described in more detail. The disk 42 is generally cone-shaped as in a conventional disk unloading device. Extending from the disk 42 is a stem 48.

The stem 48 is supported telescopically in a sleeve 50 that is fixed relative to the enclosure 14 by the braces 46 (FIG. 3). Thus, the stem 48 is mounted for bidirectional movement in the sleeve 50. Bearings 52 and 54 may be included at the proximal and distal ends 56 and 58 of the sleeve 50. Fixed on and around the sleeve 50 is a cylindrical cage 64 comprising a base 66 and a side wall 68.

An extension rod 70 extends from the distal end 72 of the stem 48, and a pressure plate 74 is fixed to the end of the rod. The pressure plate 74 is slidably mounted relative to the cage 64 by means of the frame 76. In this way, the stem 48, the extension rod 70, and the pressure plate 74 all move with the disk 42, while the sleeve 50, the cage 64, and the sleeve 50 remain in a fixed position.

With continuing reference to FIG. 4, the preferred actuator 44 further includes a biasing member, such as the coil spring 80. The proximal end 82 of the spring 80 nearer to the fan wheel 16 (FIG. 3) is received in the cage 64. The distal end 84 of the spring 80 is farther from the fan wheel 16 and extends from the cage 64. Thus, the pressure plate 74 is positioned to impinge on the distal end 84 of the spring 80. In this way, as the disk 42 moves toward the fan wheel 16 (not seen in FIG. 4), that is, in the direction indicated by the arrow 86, the pressure plate 74 approaches and eventually compresses the spring 80. The spring 80, when thus compressed, will continuously urge the disk 42 in the opposite direction, that is, in the direction indicated by the arrow 88. The travel of the pressure plate 74 in the direction 88 should extend a distance beyond the distal end 84 of the spring 80 for a reason that will become apparent.

In the embodiment shown herein, the biasing member is a coil spring 80. However, as will become apparent, the biasing member could be another type of spring, or could be another mechanism. Other suitable biasing devices include counter weights with pulleys, or levers.

Now it will be appreciated that nearly all the actuator components—the stem 48, the sleeve 50, the cage 64, the spring 80, etc.—are supported compactly and coaxially with the axis of rotation 18 of the fan wheel 16. The mechanism is simple and obtrusive to the air flow into the inlet funnel 20 (FIG. 3). Moreover, the simple coil requires no electricity or other form of external energy.

Figure 5A:
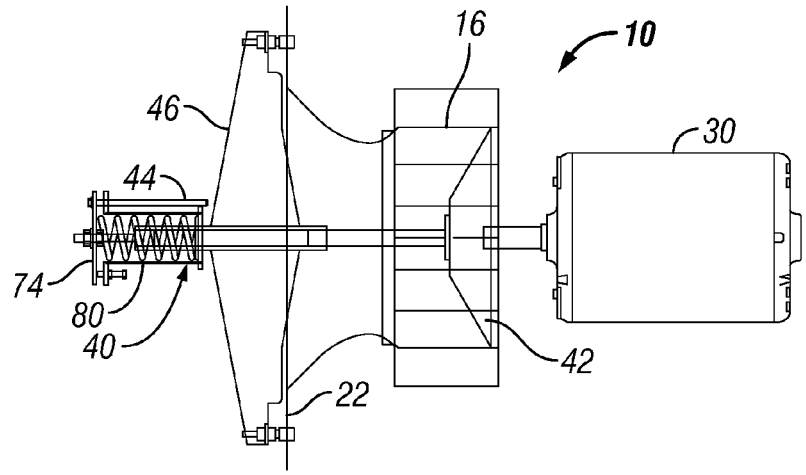
FIGS. 5A-5C show the operation of a fan unit comprising the disk unloader of FIG. 4.
Figure 5B:
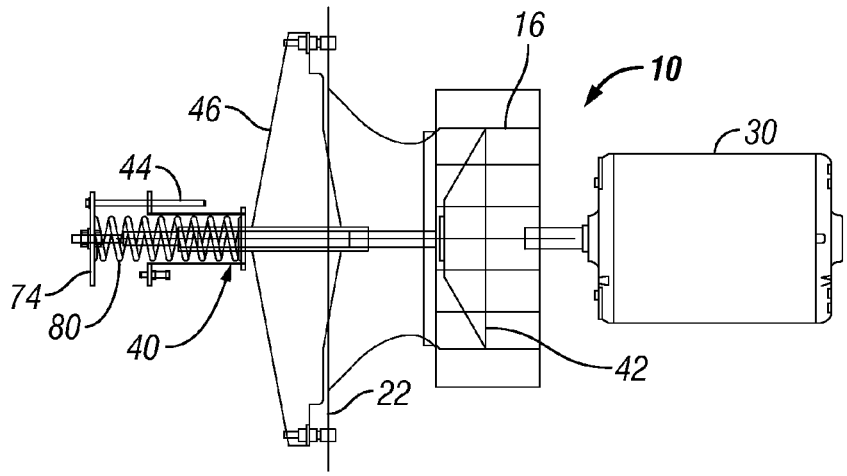
Figure 5C:
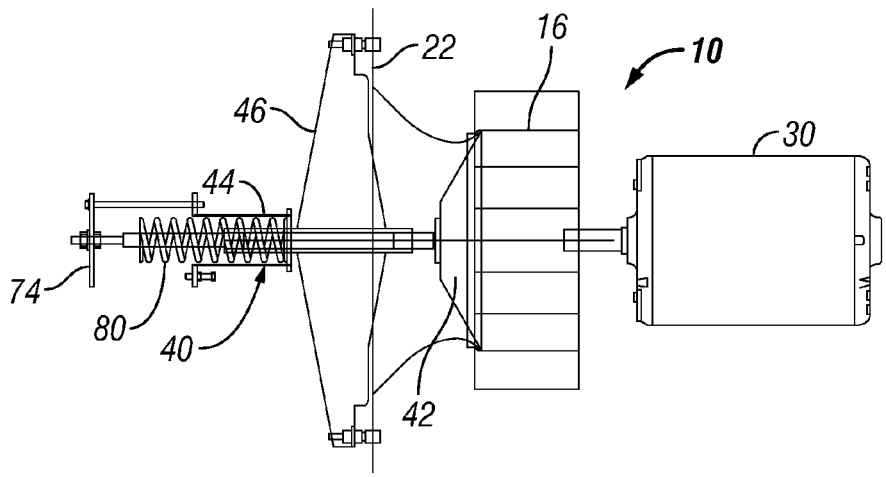

Turning now to FIGS. 5A to 5C, the operation of the disk assembly 40 will be described. FIG. 5A shows the disk assembly 40 when the fan motor 30 is operating at full speed. The pressure of the air pushes the disk 42 through the fan wheel 16 so that the full width of the blades is exposed to the air flow. As long as this volume of air flow continues, the air pressure will hold the disk in this fully open position in which the air flow through the fan wheel 16 is substantially unobstructed. The air flow must be strong enough to overcome the counterforce of the compression coil spring 80 which, as explained previously, is continuously urging the disk 42 in the opposite direction.

When the VSD 32 (not shown in FIGS. 5A-5C) reduces the speed of the fan motor 30 and thereby the rotation speed of the fan wheel 16, the air flow through the fan wheel decreases and concomitantly the air pressure against the disk 42 declines. This reduced pressure on the disk 42 allows the spring 80 to expand to its relaxed or resting length, pushing the pressure plate 74 and pulling the disk 42 with it, as seen in FIG. 5B. In this intermediate position, the exposed width of the blades in the fan wheel 16 is about fifty percent (50%) of its capacity.

Further reduction in fan speed will not cause further movement of the disk 42. However, if the fan unit 10 is powered off altogether, the air pressure downstream of the fan unit, usually from other fan units in the system, will push the disk 42 into the closed position shown in FIG. 5C. In this closed position, the peripheral edge of the disk 42 is completely seated, substantially or more preferably entirely obstructing the air flow through the fan wheel 16. This prevents backflow from the other fan units from moving upstream through the stationary fan wheel 16.

Now it will be understood that the spring 80 is sized and tensioned to hold the disk 42 in the intermediate position (FIG. 5B) when the spring is in the resting (uncompressed) position, but to gradually compress in response to the pressure on the inlet side of the disk 42. Thus, as air flow through the fan wheel 16 increases, the disk 42 is pushed toward the open position (FIG. 5A). Similarly, as air flow through the fan wheel 16 decreases, the spring 80 relaxes or is gradually released allowing the disk 42 to return to the intermediate position. Now it will be understood that the length and tension of the spring 80 will control the location of the intermediate position, and that this intermediate position can be adjusted by selecting a spring with the appropriate physical characteristics.

Figure 6:
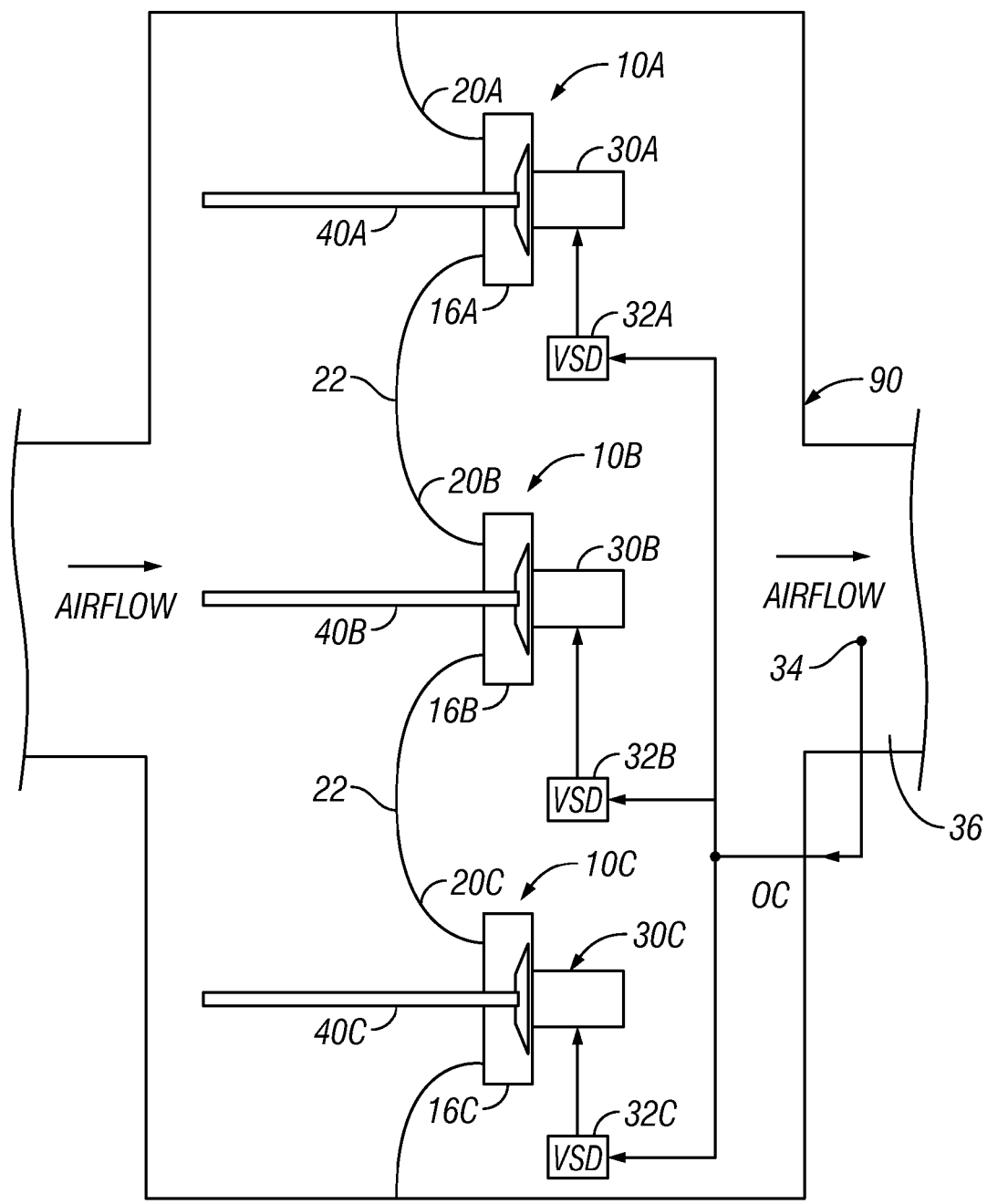
FIG. 6 is a schematic illustration of a fan array comprising a plurality of the fan units.

As indicated previously, many air delivery systems utilize a plurality of fans in a fan array to move the air through the system. FIG. 6, to which now is directed, illustrates schematically a fan array 90 in accordance with the present invention. The fan array 90 comprises three fan units 10A, 10B and 10C, each with its own fan wheel 16A, 16B, and 16C, motor 30A, 30B, and 30C, VSD 32A, 32B, and 32C, and disk unloading assembly 40A, 40B, and 40C. The plurality of fan units may include any number of fans and in virtually any configuration. For example, the fan array may be arranged in a spaced pattern array configuration, a checker board array configuration, rows slightly offset array configuration, columns slightly offset array configuration, or a staggered array configuration.

The present invention provides a fan unit with both a disk unloading assembly and a variable speed control. In a most preferred embodiment, the actuator in the disk unloading assembly is a simple compression spring. In a fan with this combination of features, the unloading range is increased by the disk unloader while power reduction at low air flows is achieved by the VSD.

Because of the high velocity of air passing through the inlet funnel of the fan unit, the unloading disk experiences a substantial axial force that pushes the disc to the fully open position. This axial force reduces as the volume of air passing through the inlet funnel is reduced. The VSD is incorporated into the system and controlled in the conventional manner. As the VSD responds to lower air volume demands by the control systems, the fan speed is reduced. The lower airflow reduces the axial force on the disk.

The spring may be selected to start reducing the wheel width at a predetermined speed, such as seventy-five percent (75%) of full speed. As the speed is further reduced, the disk will start to withdraw, reducing the exposed wheel width and further reducing the airflow. This sustains the fan speed, which in turn prevents the fan from entering the surge area, and therefore extends the fan turn-down range.

Larger, more efficient fans can be selected for any application and still yield a wide unloading range. The control of the inventive combination system is accomplished with the same equipment as a system with VSD control alone.

Figure 7:
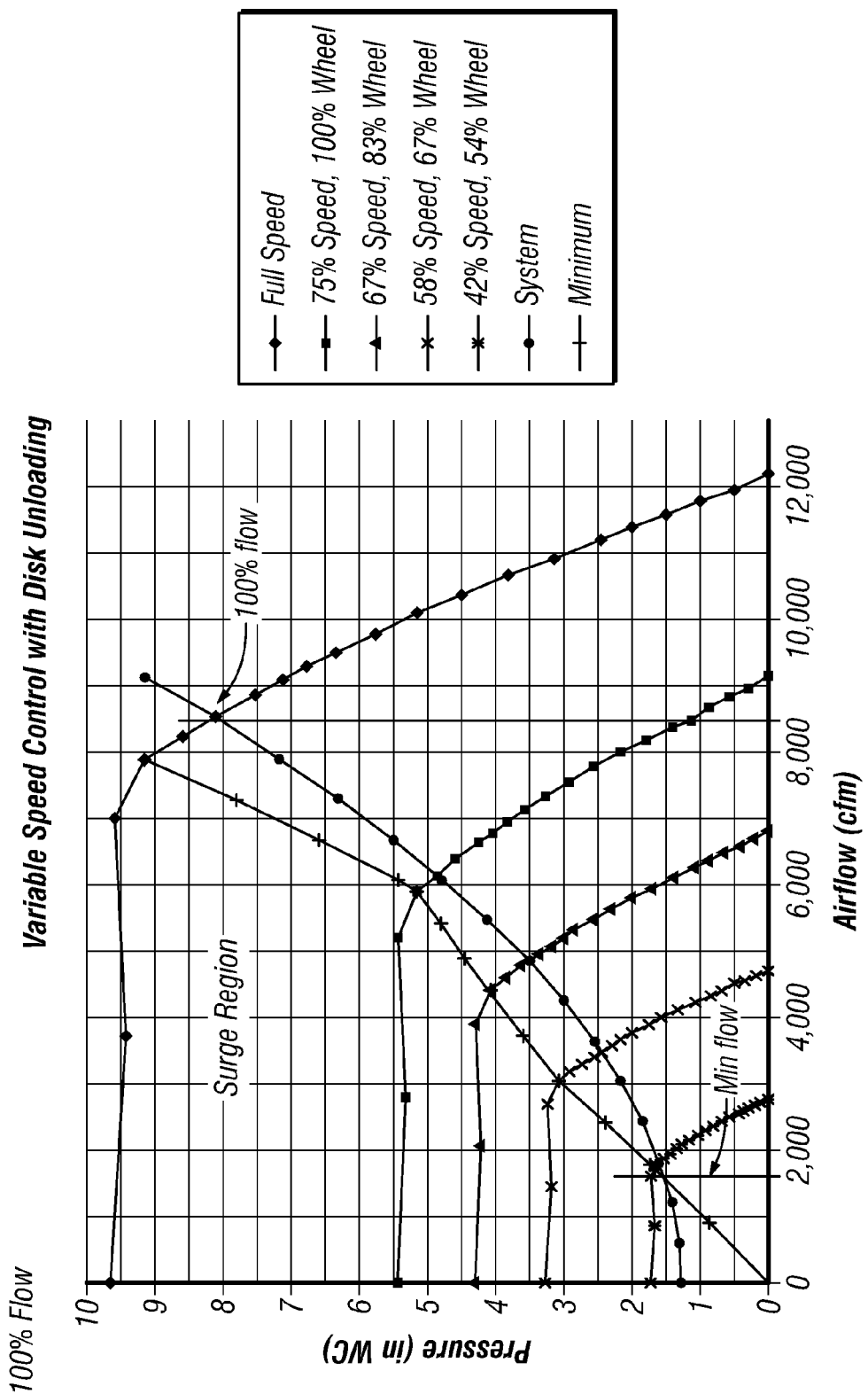
FIG. 7 is a graph of the improved operating conditions of a centrifugal fan incorporating a combination of a variable speed control and a disk unloader with a pressure-responsive actuator.

FIG. 7 shows how the combination VSD-disk unloading fan unit unloads when the VSD is controlled by the air handling system controls while at the same time the unloading disk is responding to the reduced air flow as the fan speed decreases. As shown in FIG. 4, the minimum flow is about twenty percent (20%) of the design flow for about an eighty percent (80%) turn-down capability. This compares to about thirty-nine percent (39%) turn-down for VSD-only unit.

Figure 8:
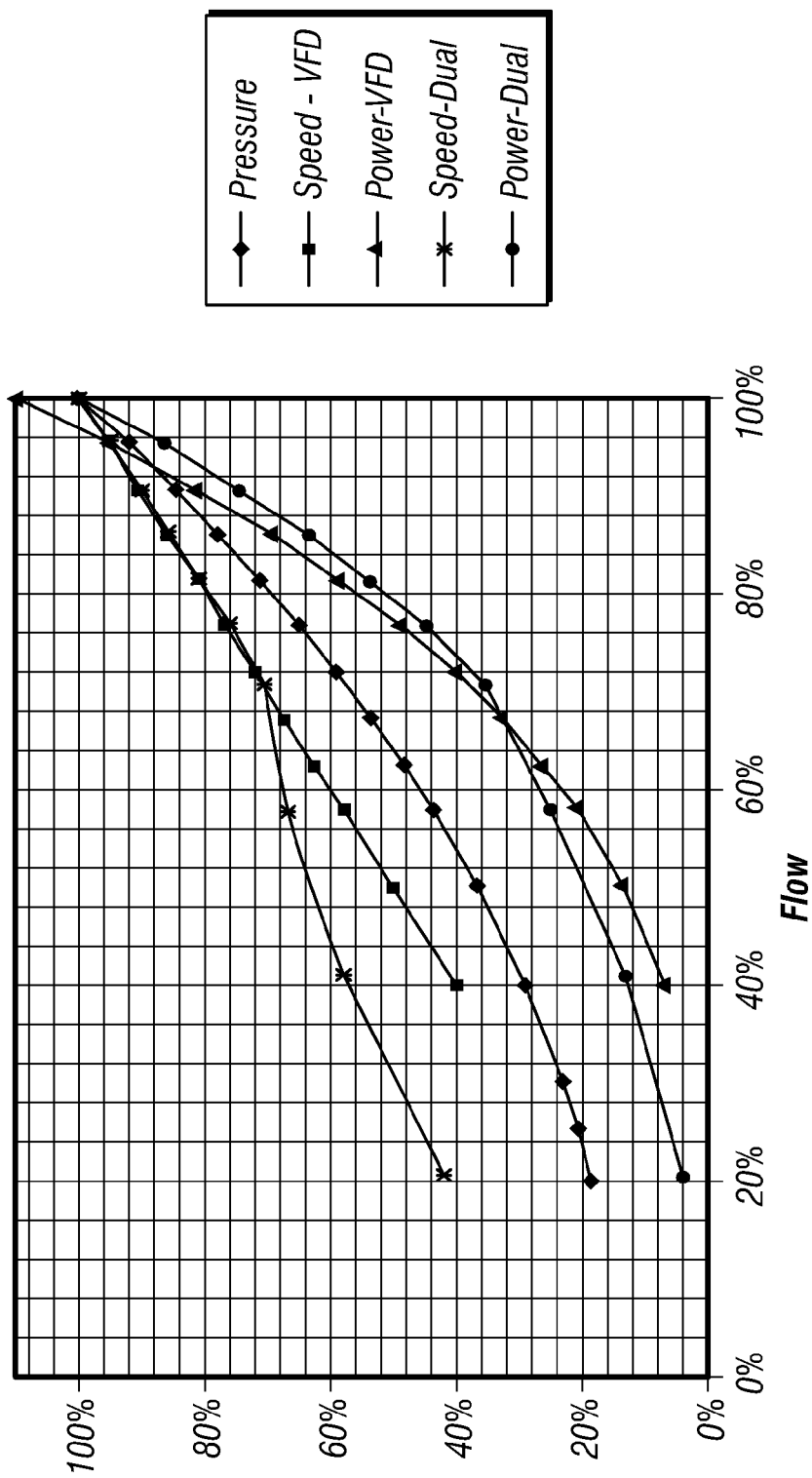
FIG. 8 is a graph showing a comparison of the fan speed reduction and the fan power reduction in the combination system with the fan speed reduction and the fan power reduction in a system with only a variable speed control.

FIG. 8 is a comparison of the fan speed reduction and the fan power reduction that occurs with the combination system and the VSD-only system. As shown, there is an increased turn-down capability in the dual system, which also offers the power reduction performance of each type of system alone. For this comparison, the base line power of the VSD-only system was increased by ten percent (10%) to simulate the effect of selecting smaller fans to extend the turn-down of the VSD-only system. The benefits of the disk unloading system used in conjunction with variable speed control include extended operating range with higher base line efficiency. This results in lower installed motor sizes while maintaining the excellent power reduction characteristics of the VSD unloading system.

The spring-operated disk unloading system has other advantages that can be used even on systems that do not require variable airflow. The spring or other biasing member can be sized to keep the disk in the fully open position when the fan is running and to drive it closed when the fan is shut off. This will prevent air from flowing backwards through the fan when it is off and reduce start-up torque requirements. This can be done automatically when the fan is shut down, and would not require any special or supplemental controls.

On multiple fan units, backflow prevention will improve the efficiency of the remaining fans in the system. If one fan in a fan array is shut off while other fans continue operating, the biasing member in the shut-off fan will move the unloading disk to the inlet funnel, and backflow pressure in the system air flow will hold the disk closed.

By adding an adjustment to the unloading disk that controls the maximum extension of the disk into the wheel, the full speed fan performance can be adjusted. This is advantageous for those fans with direct drive motors. On such fans, the motor is directly coupled to the fan wheel and belts and pulleys are not supplied. Because there is no way to vary the wheel speed from the motor speed, the full speed performance of the fan is fixed at synchronous speed of the motor. This is not a problem with systems with VSD control because the VSD varies the motor speed, and the motor and the drive can be selected to yield the design performance required from the fan. On conventional direct drive systems without VSD control (and often with VSD control), the fan wheel must be physically altered by shortening the length of the fan blades to efficiently accommodate various flow design requirements. With an adjustable stop as suggested herein, the disk can be set to simulate shorter blade lengths.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present invention have been described in the drawings and accompanying text, the description and abstract are illustrative only. Changes may be made in the details, especially in matters of shape, size, and arrangement of the parts within the principles of the invention to the full extent indicated by the broad meaning of the terms of the attached claims. The description and drawings of the specific embodiments herein do not point out what an infringement of this patent would be, but rather provide an example of how to use and make the invention. The limits of the invention and the bounds of the patent protection are measured by and defined in the following claims.

What is claimed is:

1. A fan unit for an air delivery system for delivering conditioned air to a space, the fan unit comprising:
   a centrifugal fan wheel supported in the air delivery system for rotation about an axis of rotation;
   a fan inlet to direct air from the air delivery system upstream of the fan wheel into the fan wheel;
   a fan motor for driving rotation of the fan wheel;
   a variable speed control operatively associated with the motor for controlling the speed of the fan wheel in response to the condition of the air in the space;
   an unloading disk supported inside the fan wheel to vary the available wheel width that is exposed to air flow through the fan, the disk being axially movable relative to the axis of rotation of the fan wheel bidirectionally between an open position and a closed position in response to air pressure, wherein in the open position the air flow through the fan wheel is substantially unobstructed and wherein in the closed position air flow through the fan wheel is substantially obstructed, and wherein the disk is configured to vary the wheel width that is exposed to air flow through the fan as the disk is moved between the open and closed position; and
   an actuator operatively engaged with the unloading disk, the actuator comprising a biasing member tensioned to hold the disk in an intermediate position between the open and the closed position and to yield in response to air pressure on the disk so that, as air flow through the fan wheel increases, the disk is pressed toward the open position from the intermediate position.

2. The fan unit of claim 1 wherein the motor is direct drive.

3. The fan unit of claim 1 wherein the biasing member in the actuator is a spring.

4. The fan unit of claim 3 wherein the spring is a coil spring.

5. The fan unit of claim 4 wherein the coil spring has a proximal end nearer to the fan wheel and a distal end farther from the fan wheel, and wherein the actuator further comprises:
   a sleeve fixed relative to the air delivery system;
   a stem extending from the disk, the stem being telescopically supported in the sleeve for bidirectional movement therein;
   a cage fixed relative to the sleeve, the cage sized to enclose the proximal end of the spring;
   a pressure plate fixed relative to the stem, slidably mounted relative to the cage, and adapted to impinge on the distal end of the spring so that the spring is compressed in response to increasing air pressure on the disk and released in response to decreasing air pressure on the disk.

6. The fan unit of claim 5 wherein the coil spring, stem and sleeve all are supported coaxially with the axis of rotation of the fan wheel.

7. An air delivery system comprising the fan unit of claim 1.

8. A fan array for an air delivery system for delivering conditioned air to a space, the fan array comprising a plurality of independently operable fan units, each such fan unit comprising:
   a centrifugal fan wheel supported in the air delivery system for rotation about an axis of rotation;
   a fan inlet to direct air from the air delivery system upstream of the fan wheel into the fan wheel;
   a fan motor for driving rotation of the fan wheel;
   a variable speed control operatively associated with the motor for controlling the speed of the fan wheel in response to the condition of the air in the space;
   an unloading disk supported inside the fan wheel to vary the available wheel width that is exposed to air flow through the fan, the disk being axially movable relative to the axis of rotation of the fan wheel bidirectionally between an open position and a closed position in response to air pressure, wherein in the open position the air flow through the fan wheel is substantially unobstructed and wherein in the closed position air flow through the fan wheel is substantially obstructed, and wherein the disk is configured to vary the wheel width that is exposed to air flow through the fan as the disk is moved between the open and closed position; and
   an actuator operatively engaged with the unloading disk, the actuator comprising a biasing member tensioned to hold the disk in an intermediate position between the open and the closed position and to yield in response to air pressure on the disk so that, as air flow through the fan wheel increases, the disk is pressed toward the open position from the intermediate position; and
   wherein, when the fan motor is off, the disk is movable from the intermediate position to the closed position by backflow of air from other fan units in the fan array.

9. The fan array of claim 8 wherein the motor is direct drive.

10. The fan array of claim 8 wherein the biasing member in the actuator is a spring.

11. The fan array of claim 10 wherein the spring is a coil spring.

12. The fan array of claim 11 wherein the coil spring has a proximal end nearer to the fan wheel and a distal end farther from the fan wheel, and wherein the actuator further comprises:
   a sleeve fixed relative to the air delivery system;
   a stem extending from the disk, the stem being telescopically supported in the sleeve for bidirectional movement therein;
   a cage fixed relative to the sleeve, the cage sized to enclose the proximal end of the spring;
   a pressure plate fixed relative to the stem, slidably mounted relative to the cage, and adapted to impinge on the distal end of the spring so that the spring is compressed in response to increasing air pressure on the disk and released in response to decreasing air pressure on the disk.

13. The fan array of claim 12 wherein the coil spring, stem and sleeve all are supported coaxially with the axis of rotation of the fan wheel.

14. An air delivery system comprising the fan array of claim 8.

* * * * *